(12) United States Patent
Kawasaki et al.

(10) Patent No.: US 7,778,119 B2
(45) Date of Patent: Aug. 17, 2010

(54) OBJECTIVE LENS HOLDING DEVICE AND OPTICAL PICKUP APPARATUS

(75) Inventors: Ryoichi Kawasaki, Gunma (JP); Hiroyuki Shindo, Tokyo (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 753 days.

(21) Appl. No.: 11/696,533

(22) Filed: Apr. 4, 2007

(65) Prior Publication Data

US 2007/0247982 A1  Oct. 25, 2007

(30) Foreign Application Priority Data

Apr. 4, 2006 (JP) .............................. 2006-103458

(51) Int. Cl.
*G11B 7/00* (2006.01)
(52) U.S. Cl. .............. 369/44.14; 369/44.37; 369/44.15; 369/112.23
(58) Field of Classification Search .............. 369/44.14, 369/44.15, 112.23, 44.37
See application file for complete search history.

(56) References Cited

U.S. PATENT DOCUMENTS 6,021,107 A * 2/2000 Tsukahara et al. .......... 720/669

2005/0007906 A1 * 1/2005 Horinouchi et al. ...... 369/44.37

FOREIGN PATENT DOCUMENTS

| JP | 04301237 A | 10/1992 |
| JP | 6333255 A | 12/1994 |
| JP | 9115170 A | 5/1997 |
| JP | 9297927 A | 11/1997 |
| JP | 9306012 A | 11/1997 |
| JP | 2005293686 A | 10/2005 |
| WO | WO98/02874 | 1/1998 |

OTHER PUBLICATIONS

Chinese Office Action for Patent Application No. 200710092009.X dated Jan. 8, 2010, 11pages.
Japanese Notification of Reasons for Rejection for Application No. 2006-103458 dated Apr. 22, 2010, 4 pages.

* cited by examiner

*Primary Examiner*—Wayne R Young
*Assistant Examiner*—LaTanya Bibbins
(74) *Attorney, Agent, or Firm*—Fish & Richardson P.C.

(57) ABSTRACT

An objective lens holding device includes a first objective lens, a second objective lens, and a lens holder, wherein an axis-to-axis distance between a central axis of the first objective lens and a central axis of the second objective lens is set to a distance, depending on a first length and a second length, which distance prevents a second edge portion from butting against a turntable when the first objective lens focuses light from a first laser on an innermost circumference of the information recording layer of an optical disc.

8 Claims, 10 Drawing Sheets

OBJECTIVE LENS HOLDING DEVICE AND OPTICAL PICKUP APPARATUS

CROSS-REFERENCE TO RELATED APPLICATION

This application claims the benefit of priority to Japanese Patent Application No. 2006-103458, filed Apr. 4, 2006, of which full contents are incorporated herein by reference.

BACKGROUND OF THE INVENTION

1. Field of the Invention

The present invention relates to an objective lens holding device and an optical pickup apparatus.

2. Description of the Related Art

Figure 9A:
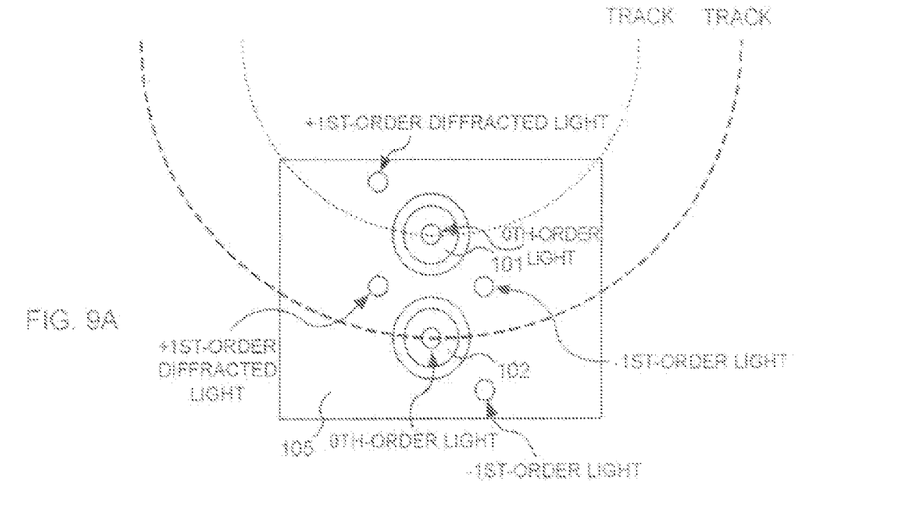
FIGS. 9A and 9B depict two objective lenses disposed in the radial direction and the tangential direction, respectively.
Figure 9B:
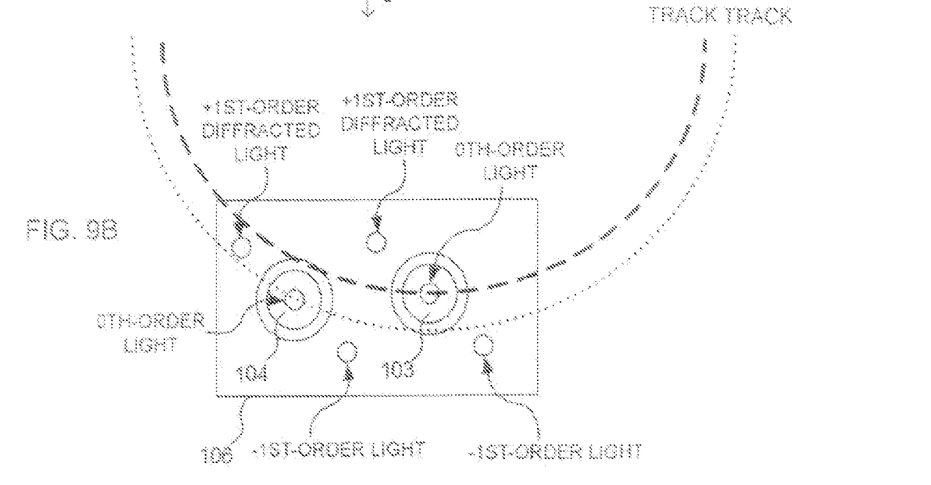

As conventional recording media for information recording/reproduction, there are optical discs such as a CD (Compact Disc) using infrared laser light, a DVD (Digital Versatile Disc) using red laser light, etc. Recently proposed are an optical disc (HD DVD (High Definition DVD) using blue-violet laser light and a Blu-ray Disc (registered trademark), both capable of higher density recording than the conventional optical discs. To perform information recording/reproduction on those optical discs, there exists e.g., an optical pickup apparatus having a single lens holder mounted with an objective lens for focusing laser light for the conventional optical discs and with an objective lens for focusing blue-violet laser light for the Blu-ray Disc, etc. The disposition of the two objective lenses relative to an optical disc can be e.g., as shown in FIGS. 9A and 9B, such that they are disposed in the direction of a radius (hereinafter, referred to as radial direction) of the optical disc (FIG. 9A) or such that they are disposed in the direction of a tangent (hereinafter, referred to as tangential direction) of tracks spirally formed on an information recording layer of the optical disc (FIG. 9B)

In the information recording/reproduction on the optical disc, a tracking control is executed to cause a laser light to follow a track to be a target of information recording/reproduction (hereinafter, referred to as information recording/reproduction target track). The tracking control employs in general a differential push-pull method, a three-beam method, etc., wherein three laser lights (0th-order light, ±1st-order diffracted lights) are used, which are obtained by diffracting laser lights by e.g., a diffraction grating. The differential push-pull method, etc., wherein the three laser lights are used, make it possible to provide better tracking control than the conventional push-pull method, etc. by applying +1st-order diffracted light and −1st-order diffracted light line-symmetrically with respect to the tangential direction of the information recording/reproduction target track.

In the case of disposing two objective lenses 101 and 102 in the radial direction (FIG. 9A), in any case when emitting 0th-order light and ±1st-order diffracted lights from the objective lenses 101 and 102, +1st-order diffracted light and −1st-order diffracted light can be applied line-symmetrically with respect to the tangential direction of the information recording/reproduction target track, enabling the tracking control based on the differential push-pull method, etc. On the other hand, in the case of disposing the objective lenses in the tangential direction (FIG. 9B), when emitting 0th-order light and ±1st-order diffracted lights from the objective lens 103, +1st-order diffracted light and −1st-order diffracted light can be applied line-symmetrically with respect to the tangential direction of the information recording/reproduction target track. However, when emitting 0th-order light and ±1st-order diffracted lights from the objective lens 104, +1st-order diffracted light and the −1st-order diffracted light are applied line-asymmetrically with respect to the information recording/reproduction target track.

This may result in fluctuations in amplitude of tracking error signal corresponding to the reflected lights of 0th-order light and ±1st-order diffracted lights, making infeasible the tracking control based on the differential push-pull method, etc. Therefore, in the case of disposing the objective lenses in the tangential direction, another push-pull method, etc. based on 0th-order reflected light is employed, which may be inferior to the differential push-pull method, etc. in tracking control.

In this manner, when mounting two objective lenses on a single lens holder in the optical pickup apparatus, it is desirable to choose the disposition in the radial direction, whereby better tracking control based on the differential push-pull method, etc. can be executed.

Such a technique is disclosed in International Publication WO98/02874.

Figure 10:
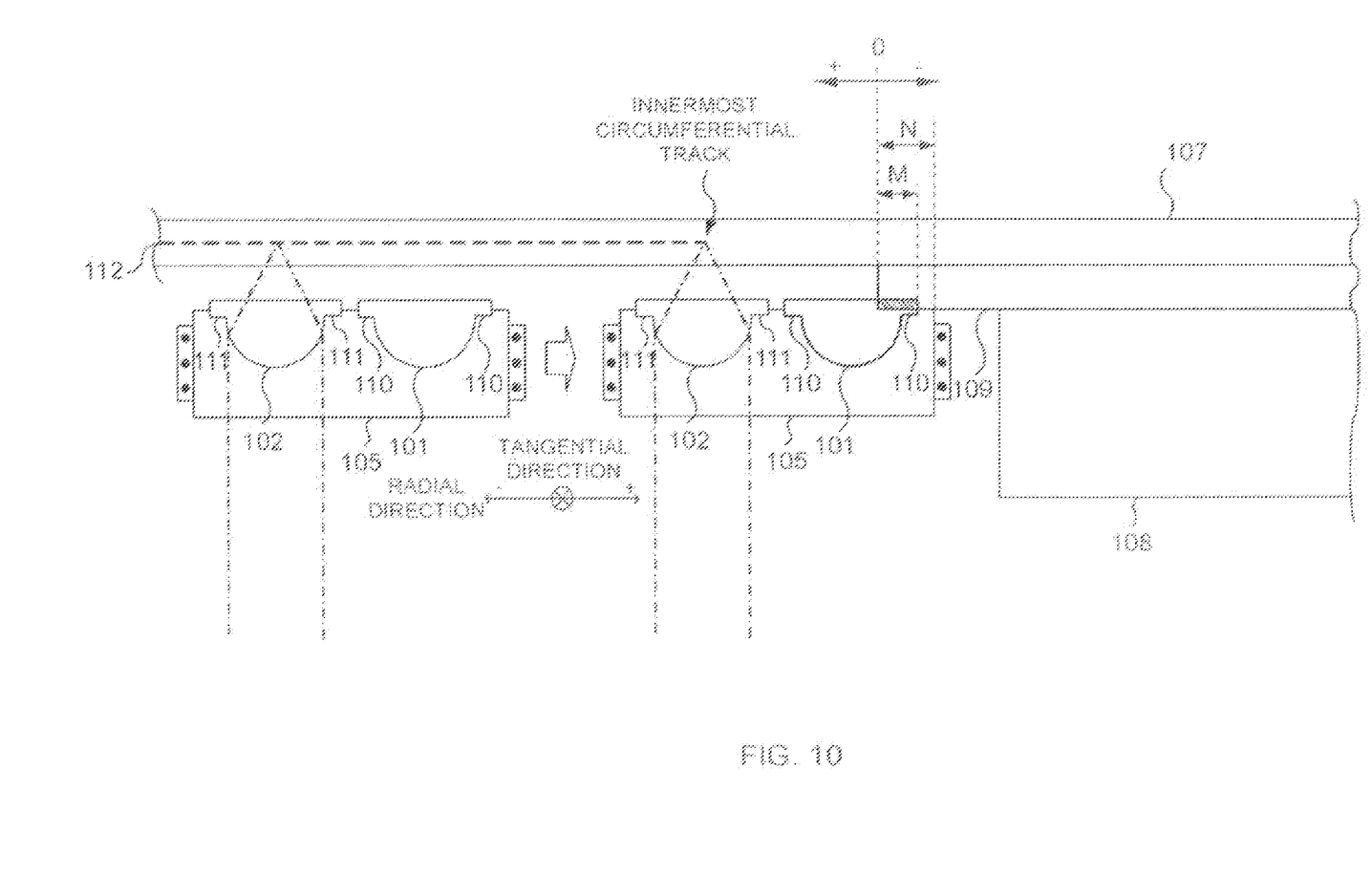
FIG. 10 depicts the radially inside objective lens butting against a turntable.
Figure 11:
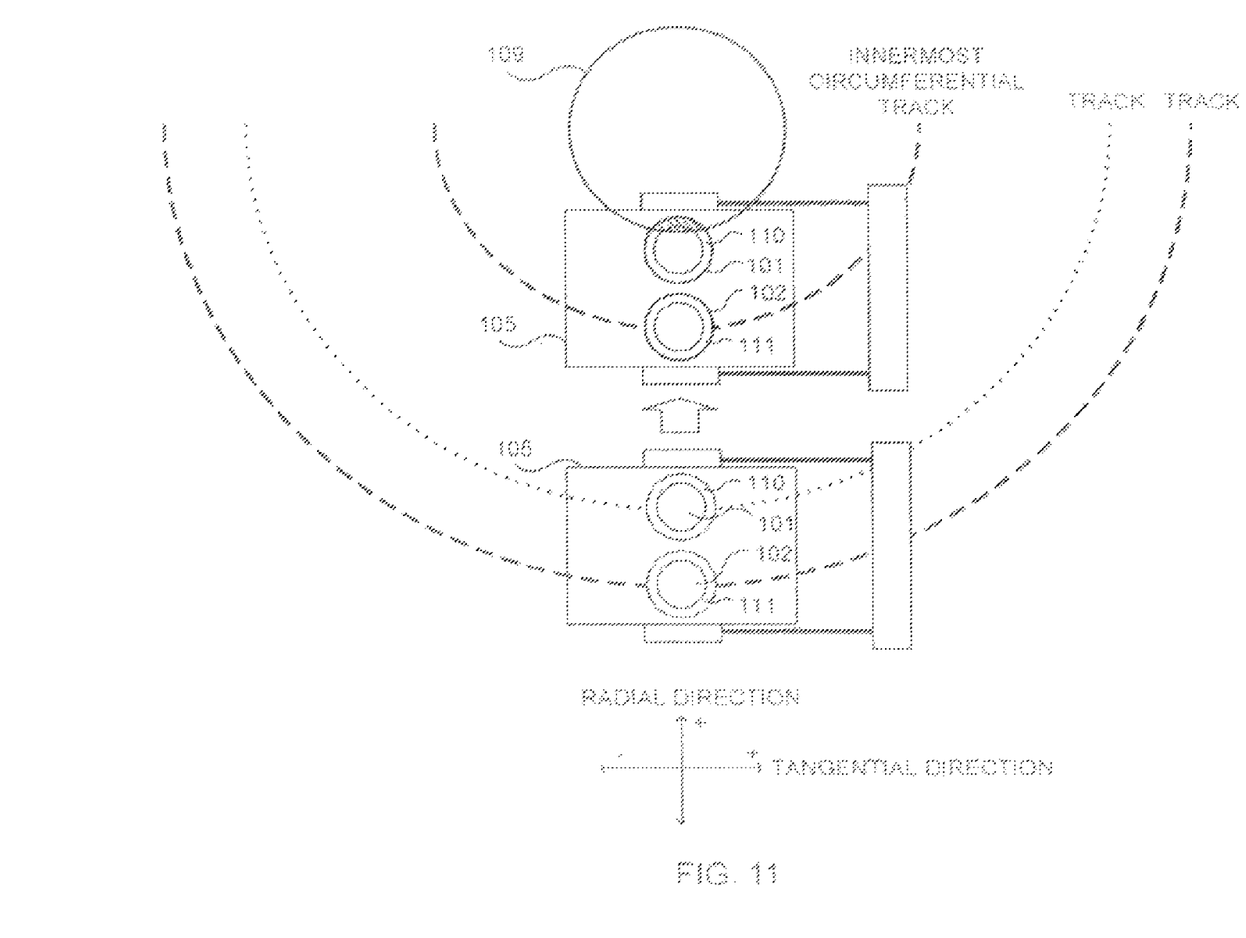
FIG. 11 depicts the radially inside objective lens butting against the turntable.

However, in the case of disposing the two objective lenses 101 and 102 in the radial direction, e.g., when the radially outside objective lens 102 focuses laser light on a track of an information recording layer 112 of an optical disc 107, the radially inside objective lens 101 is positioned more radially inside than in the case of disposing the lenses in the tangential direction or in the case of mounting only a single objective lens in the lens holder. When the radially outside objective lens 102 focuses laser light on, e.g., a track of a more radially inside area (hereinafter, referred to as innermost circumference of the information recording layer) than a read-in area (or PCA (Power Calibration Area)) of the information recording layer 112 of the optical disc 107, the radially inside objective lens 101 is positioned most inside in the radial direction. In the more radially inside area than the read-in area, etc., there is recorded information indicating, e.g., that the optical disc 107 is Light Scribe support. In the case of simply using a lens holder 105 having specifications of no need to move to a more radially inside area than a read-in area (or PCA), since proper restrictions are not imposed on the shape of the lens holder 105 or on the objective lenses 101 and 102, the edge portion 110 of the radially inside objective lens 101 may butt against a turntable 109 when moving to the innermost circumference of the information recording layer 112 as shown in FIGS. 10 and 11. FIG. 10 depicts a movement of the lens holder 105 to the innermost circumference of the information recording layer 112, wherein the position of the periphery of the turntable 109 in the radial direction is set to be zero and the distance between the turntable 109 and the edge portion 110 of the objective lens 101 is denoted as M. Note that the distance M on the plus (+) side denotes the distance M when the edge portion 110 is apart from the periphery of the turntable 109 and that the distance M on the minus (−) side (inclusive of zero, the same applies hereinafter) denotes the distance M when the edge portion 110 is assumed to move further inside of the zero position. FIG. 11 is a plan view of FIG. 10.

Even though the edge portion 110 of the objective lens 101 does not butt against the turntable 109 (i.e., the distance M is on the plus(+) side) when moving to the innermost circumference of the information recording layer 112, there might be a possibility of the edge portion 110 of the objective lens 101 butting against the turntable 109 in the following case. That is, the distance M at that time becomes less than the amount of radial movement of the lens holder 105 as a result of tracking control for causing laser light from the radially outside objective lens 102 to follow the innermost circumference of the information recording layer 112. If the edge portion 110 of the objective lens 101 butts against the turntable 109, then it may become difficult to focus laser light on the innermost circumference of the information recording layer 112, and to record/reproduce information on/from the innermost circumference of the information recording layer 112. Further, if the objective lenses 101 and 102 tilt together with the lens holder 105 as a result of butting, then it may become difficult to focus laser light on tracks of the overall information recording layer 112, and to record/reproduce information on/from the optical disc 107.

It can be considered that one approach to solve the problems is reducing the diameter of the objective lenses 101 and 102. However, a reduction in diameter of the objective lenses 101 and 102 results in reducing a effective diameter for focusing laser light, whereupon if an actuator (not shown) mounted with the objective lenses 101 and 102 shifts in the radial direction to follow the disc eccentricity, etc., then there may arise, e.g., a reduction in quantity of light of laser light focused on the optical disc 107 or a degradation in amplitude of a signal (reproduced signal, etc.) corresponding to the reflected light of laser light, which may induce another problem.

Therefore the object of the present invention is to provide an objective lens holding device and an optical pickup apparatus, enabling a radially outside objective lens to focus laser light on an innermost circumference of an information recording layer of an optical disc without a radially inside objective lens butting against a turntable.

SUMMARY OF THE INVENTION

In order to solve the above problems, according to a first major aspect of the present invention there is provided an objective lens holding device comprising: a first objective lens including a first lens unit that, when a first optical disc is mounted on a turntable, focuses first laser light on an information recording layer of the first optical disc, and a first edge portion protruding from a peripheral face of the first lens unit on the side thereof from which the first laser light is emitted; a second objective lens including a second lens unit that, when a second optical disc with an information recording format different from that of the first optical disc is mounted on the turntable, focuses second laser light with a wavelength different from that of the first laser light on an information recording layer of the second optical disc, and a second edge portion protruding from a peripheral face of the second lens unit on the side thereof from which the second laser light is emitted; and a lens holder including a first hole into which the first lens unit is dropped, a first contacting portion that contacts with the first edge portion to restrict dropping of the first lens unit into the first hole, a second hole into which the second lens unit is dropped, and a second contacting portion that contacts with the second edge portion to restrict dropping of the second lens unit into the second hole, the lens holder integrally holding the first objective lens and the second objective lens in an adjacent manner on the outside and inside, respectively, along a radial direction of the first optical disc and the second optical disc when the first optical disc and the second optical disc are mounted on the turntable, the lens holder being shiftable along the radial direction, wherein a first length in the radial direction of the first edge portion on the side thereof which is confronting the second edge portion is less than a length in the radial direction of the first edge portion on the side thereof which is not confronting the second edge portion, and/or a second length in the radial direction of the second edge portion on the side thereof which is confronting the first edge portion is less than a length in the radial direction of the second edge portion on the side thereof which is not confronting the first edge portion, and wherein an axis-to-axis distance between a central axis of the first objective lens and a central axis of the second objective lens is set to a distance, depending on the first length and the second length, which distance prevents the second edge portion from butting against the turntable when the first objective lens focuses the first laser light on an innermost circumference of the information recording layer of the first optical disc.

To solve the above problems, according to a second major aspect of the present invention there is provided an objective lens holding device comprising: a first objective lens including a first lens unit that, when a first optical disc is mounted on a turntable, focuses first laser light on an information recording layer of the first optical disc, and a first edge portion protruding from a peripheral face of the first lens unit on the side thereof from which the first laser light is emitted; a second objective lens including a second lens unit that, when a second optical disc with an information recording format different from that of the first optical disc is mounted on the turntable, focuses second laser light with a wavelength different from that of the first laser light on an information recording layer of the second optical disc, and a second edge portion protruding from a peripheral face of the second lens unit on the side thereof from which the second laser light is emitted; and a lens holder including a first hole into which the first lens unit is dropped, a first contacting portion that contacts with the first edge portion to restrict dropping of the first lens unit into the first hole, a second hole into which the second lens unit is dropped, and a second contacting portion that contacts with the second edge portion to restrict dropping of the second lens unit into the second hole, the lens holder integrally holding the first objective lens and the second objective lens in an adjacent manner on the outside and inside, respectively, along a radial direction of the first optical disc and the second optical disc when the first optical disc and the second optical disc are mounted on the turntable, the lens holder being shiftable along the radial direction, wherein the first edge portion on the side thereof which is confronting the second edge portion and the second edge portion on the side thereof which is confronting the first edge portion are joined together to integrate the first objective lens and the second objective lens.

To solve the above problems, according to a third major aspect of the present invention there is provided an optical pickup apparatus comprising the above objective lens holding device.

According to the present invention, the radially outside objective lens is allowed to focus laser light on the innermost circumference of the information recording layer of the optical disc without the radially inside objective lens butting against the turntable.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from the descriptions of this specification and of the accompanying drawings.

Configuration Example of Optical Pickup Apparatus

Figure 2:
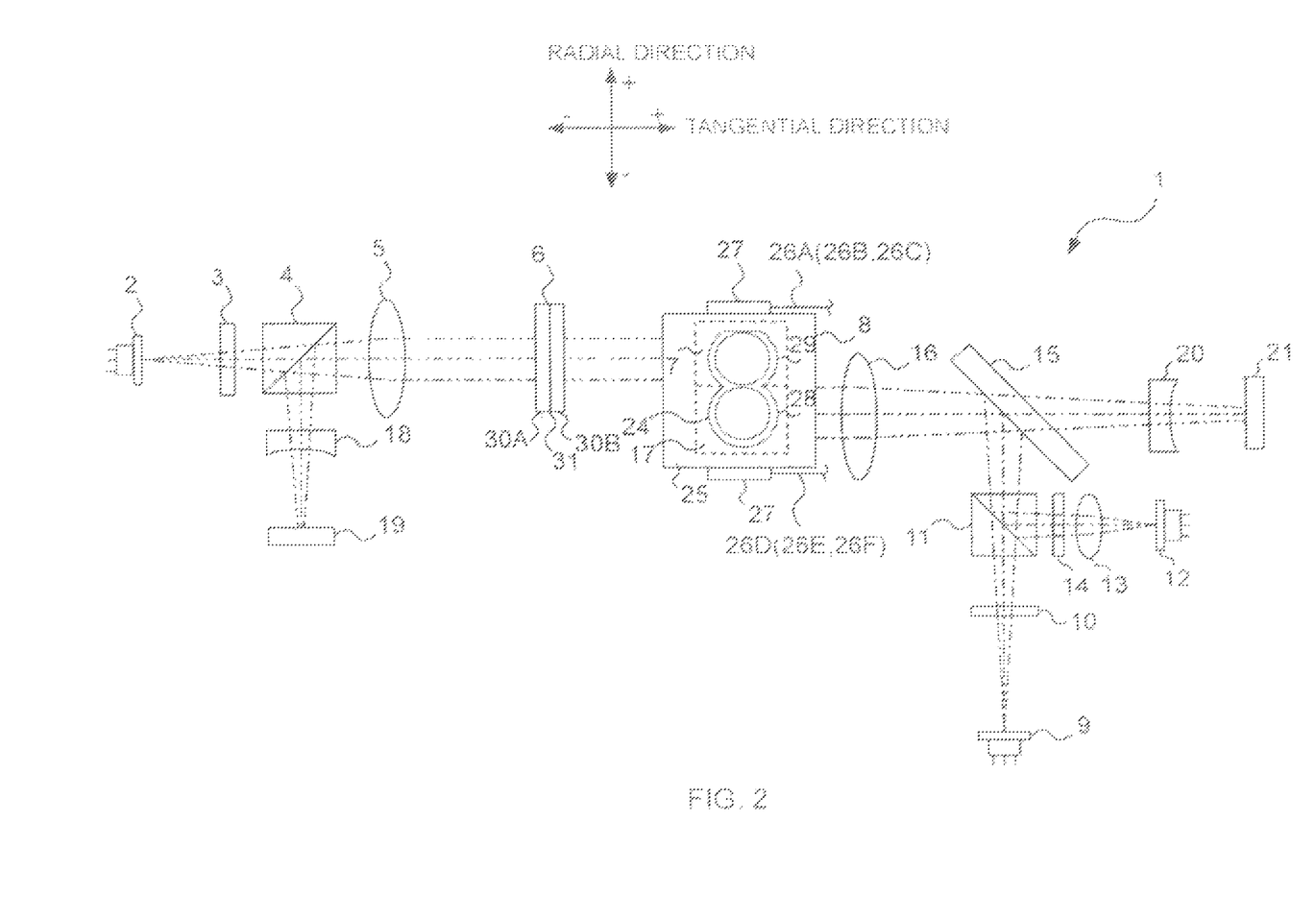
FIG. 2 depicts an overall configuration of an optical pickup apparatus according to the present invention.
Figure 3A:
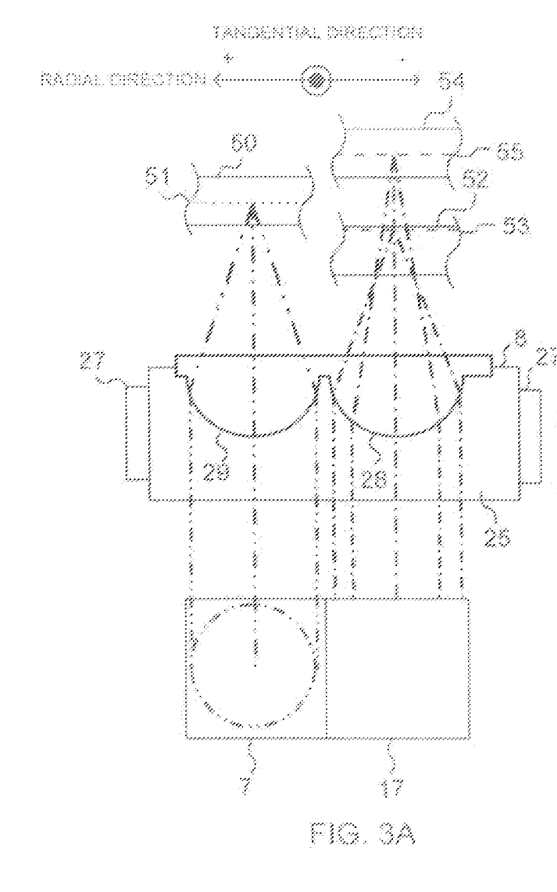
FIGS. 3A and 3B are a front view and a rear view, respectively, of the objective lens holding device of the present invention.
Figure 3B:
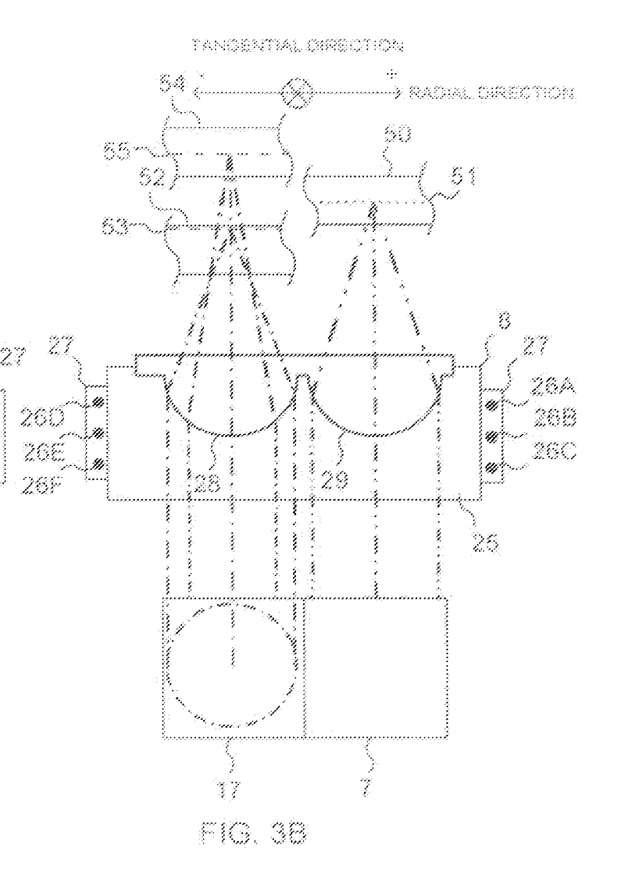

Referring to FIG. 2 and FIGS. 3A and 3B, description will be made of the overall configurations of an objective lens holding device 8 and an optical pickup apparatus 1, according to the present invention. FIG. 2 depicts an example of the overall configuration of the optical pickup apparatus 1 of the present invention. FIG. 3A is a front view from the minus (−) tangential direction. FIG. 3B is a rear view of FIG. 3A. As used in this embodiment, the radial direction refers to the radial direction of an HD DVD or a Blu-ray Disc (hereinafter, referred to as HD DVD 50), a CD 52, and a DVD 54 when they are mounted on a turntable 109 (see FIG. 4). The tangential direction refers to the tangential direction of tracks formed on information recording layers 51, 53, and 55 of the HD DVD 50, the CD 52, and the DVD 54, respectively, when they are mounted on the turntable 109.

The optical pickup apparatus 1 includes a blue-violet semiconductor laser 2, diffraction gratings 3, 10, and 14, a beam splitter 4, collimator lenses 5 and 16, a liquid crystal aberration correcting element 6, rising mirrors 7 and 17, an objective lens holding device 8, a red semiconductor laser 9, a dichroic prism 11, an infrared semiconductor laser 12, a coupling lens 13, a plate beam splitter 15, sensor lenses 18 and 20, and photodetectors 19 and 21. It is to be noted that the optical pickup apparatus 1 has a front monitor diode, etc., included in the ordinary optical pickup apparatus although they are not shown due to no relation to the gist of the present invention.

<<Optical System for HD DVD 50>>

The blue-violet semiconductor laser 2 is comprised of e.g., a pn junction diode (not shown) consisting of a p-type semiconductor and an n-type semiconductor. In response to a control voltage applied from a laser driving circuit (not shown), the blue-violet semiconductor laser 2 emits InGaN blue-violet laser light (dashed double-dotted line) with a wavelength (400 to 410 nm) corresponding to the thickness (HD DVD: 0.6 mm, Blu-ray Disc: 0.75 to 0.1 mm) of a protective layer up to the information recording layer 51 of the HD DVD 50.

The diffraction grating 3 diffracts blue-violet laser light to generate, e.g., 0th-order light and ±1st-order diffracted lights, which in turn enter the beam splitter 4. It is to be noted in this embodiment that the 0th-order light and the ±1st-order diffracted lights are referred to as blue-violet laser light for the following description unless otherwise specified in particular.

The beam splitter 4 allows blue-violet laser light to pass therethrough into the collimator lens 5. The beam splitter 4 reflects the reflected light of blue-violet laser light emitted from the collimator lens 5 into the sensor lens 18, wherein the blue-violet laser light is applied to and reflected from the information recording layer 51 of the HD DVD 50.

The collimator lens 5 converts blue-violet laser light into parallel light, which in turn enters the liquid crystal aberration correcting element 6. The collimator lens 5 converts the reflected light of blue-violet laser light from the liquid crystal aberration correcting element 6, into convergent light, which in turn enters the beam splitter 4.

The liquid crystal aberration correcting element 6 includes glass substrates 30A and 30B disposed so as to confront each other, and a liquid crystal molecular layer 31 having liquid crystal molecules sealed therein between the glass substrates 30A and 30B. The orientation of the liquid crystal molecules of the liquid crystal molecular layer 31 is set in advance to such an orientation as to correct coma which may arise due to a tilt of the HD DVD 50 relative to the optical axis of blue-violet laser light. The liquid crystal aberration correcting element 6 allows blue-violet laser light through the liquid crystal molecular layer 31 to impinge on the rising mirror 7. The liquid crystal aberration correcting element 6 allows the reflected light of blue-violet laser light from the rising mirror 7 to enter the collimator lens 5.

The rising mirror 7 reflects blue-violet laser light to allow blue-violet laser light to enter a second objective lens 29 of the objective lens holding device 8. The rising mirror 7 reflects the reflected light of blue-violet laser light from the objective lens holding device 8, into the liquid crystal aberration correcting element 6.

The sensor lens 18 imparts astigmatism to the reflected light of blue-violet laser light from the beam splitter 4 in order to execute focusing control based on, e.g., a differential astigmatism method, and emits to the photodetector 19.

The photodetector 19 has an e.g., four-split, photoreception area for receiving individually the reflected light of 0th-order light and the reflected lights of ±1st-order diffracted lights, which are the reflected lights of blue-violet laser light. The photodetector 19 generates an electrical signal photoelectrically converted in response to the light amount of the reflected light of 0th-order light, and outputs the electric signal to a subsequent processing circuit (not shown). As a result, information reproduction from the information recording layer 51 of the HD DVD 50 is executed based on the electrical signal corresponding to the reflected light of 0th-order light. The photodetector 19 generates an electrical signal photoelectrically converted in response to the light amount of the reflected lights of ±1st-order diffracted lights, and outputs the electric signal to a subsequent servo control circuit (not shown) together with the electrical signal corresponding to the reflected light of 0th-order light. As a result, a tracking error signal, a focus error signal, etc. are generated based on the electrical signal corresponding to the reflected lights of 0th-order light and of ±1st-order diffracted lights, and the tracking control based on the differential push-pull method, the focusing control based on the differential astigmatism method, etc. are executed via the magnetic member.

<<Optical System for CD 52/DVD 54>>

The red semiconductor laser 9 is comprised of e.g., a pn junction diode (not shown) consisting of a p-type semiconductor and an n-type semiconductor. In response to a control voltage applied from a laser driving circuit (not shown), the red semiconductor laser 9 emits AlGaInP red laser light (dashed dotted line) with a wavelength (650 to 660 nm) corresponding to the thickness (0.6 mm) of a protective layer up to the information recording layer 55 of the DVD 54.

The diffraction grating 10 diffracts red laser light to generate, e.g., 0th-order light and ±1st-order diffracted lights, which in turn enter the dichroic prism 11. It is to be noted in this embodiment that the 0th-order light and the ±1st-order diffracted lights are referred to as red laser light for the following description unless otherwise specified in particular.

The infrared semiconductor laser 12 is comprised of e.g., a pn junction diode (not shown) consisting of a p-type semiconductor and an n-type semiconductor. In response to a control voltage applied from a laser driving circuit (not shown), the infrared semiconductor laser 12 emits AlGaAs infrared laser light (dashed dotted line) with a wavelength (780 to 790 nm) corresponding to the thickness (1.2 mm) of a protective layer up to the information recording layer 53 of the CD 52.

The coupling lens 13 converts the angle of divergence of infrared laser light in the form of diffused light, for delivery to the diffraction grating 14.

The diffraction grating 14 diffracts infrared laser light to generate, e.g., 0th-order light and ±1st-order diffracted lights, which in turn enter the dichroic prism 11. It is to be noted in this embodiment that the 0th-order light and the ±1st-order diffracted lights are referred to as infrared laser light for the following description unless otherwise specified in particular.

The dichroic prism 11 allows red laser light to pass therethrough into the plate beam splitter 15. The dichroic prism 11 reflects infrared laser light into the plate beam splitter 15.

The plate beam splitter 15 reflects red laser light and infrared laser light into the collimator lens 16. The plate beam splitter 15 allows the reflected light of red laser light and the reflected light of the infrared laser light from the collimator lens 16 to pass therethrough into the sensor lens 20, wherein red laser light is applied to and reflected from the information recording layer 55 of the DVD 54, and infrared laser light is applied to and reflected from the information recording layer 53 of the CD 52.

The collimator lens 16 converts red laser light and infrared laser light into parallel light, which in turn impinge on the rising mirror 17. The collimator lens 16 converts light, which in turn impinge on the plate beam splitter 15.

The rising mirror 17 reflects red laser light and infrared laser light to allow red laser light and infrared laser light to enter a first objective lens 28 of the objective lens holding device 8. The rising mirror 17 reflects the reflected light of red laser light and the reflected light of infrared light from the objective lens holding device 8, into the collimator lens 16.

The sensor lens 20 imparts astigmatism to the reflected light of red laser light and the reflected light of infrared laser light from the plate beam splitter 15 in order to exercise focusing control based on, e.g., the differential astigmatism method, for delivery to the photodetector 21.

The photodetector 21 has an e.g., four-split, photoreception area for receiving the reflected light of 0th-order light and the reflected lights of ±1st-order diffracted lights, which are the reflected lights of red laser light and of infrared laser light. The photodetector 21 generates an electrical signal photoelectrically converted in response to the light amount of the reflected light of 0th-order light, and output to a subsequent processing circuit (not shown) As a result, information reproduction from the information recording layer 55 of the DVD 54 is carried out based on the electrical signal corresponding to the reflected light of 0th-order light (red laser light). Information reproduction from the information recording layer 53 of the CD 52 is carried out based on the electrical signal corresponding to the reflected light of 0th-order light (infrared laser light). Moreover, the photodetector 21 generates an electrical signal photoelectrically converted in response to the light amount of the reflected lights of ±1st-order diffracted lights, to provide the electric signal as its outputs to a subsequent servo control circuit (not shown) together with the electrical signal corresponding to the reflected light of 0th-order light. As a result, a tracking error signal, a focus error signal, etc., are generated based on the electrical signal corresponding to the reflected lights of 0th-order light and of ±1st-order diffracted lights, so that the tracking control based on the differential push-pull method, the focusing control based on the differential astigmatism method, etc., are carried out via the magnetic member.

<<Objective Lens Holding Device 8>>

The objective lens holding device 8 includes the first objective lens 28, the second objective lens 29, and a lens holder 25. The features of the objective lens holding device 8 according to the present invention will hereinafter be detailed. The lens holder 25 has a coil for tracking control, a coil for focusing control, which are not shown, etc. The lens holder 25 has a wire retaining member 27 integrally formed therewith that retains each one end of suspension wires 26A to 26F and each of the other end is secured fixedly to an actuator board (not shown). The lens holder 25 is resiliently held on the actuator board by resilient forces of the suspension wires 26A to 26F. The lens holder 25 undergoes a radial movement (tracking control), a movement in the optical axis direction of the laser light (focusing control), etc., by a magnetic action generated between: a magnetic member (a magnet, a yoke, etc., not shown) on the actuator board; and the coil for tracking control and the coil for focusing control. The first objective lens 28 has a numerical aperture (0.6 to 0.65) corresponding to the thickness of the protective layer of the DVD 54 and focuses red laser light from the rising mirror 17 on the information recording layer 55 of the DVD 54. The first objective lens 28 focuses infrared laser light from the rising mirror 17 on the information recording layer 53 of the CD 52. The first objective lens 28 converts the reflected light of red laser light into parallel light, wherein the red laser light is irradiated to and reflected from the information recording layer 55 of the DVD 54, and the parallel light in turn impinges on the rising mirror 17. The first objective lens 28 converts the reflected light of infrared laser light into parallel light, wherein the infrared laser light is irradiated to and reflected from the information recording layer 53 of the CD 52, and the parallel light in turn impinges on the rising mirror 17. The second objective lens 29 has a numerical aperture (0.65) corresponding to the thickness of the protective layer of the HD DVD 50 and focuses blue-violet laser light from the rising mirror 7 on the information recording layer 51 of the HD DVD 50. The second objective lens 29 converts the reflected light of blue-violet laser light into parallel light, wherein the blue-violet laser light is irradiated to and reflected from the information recording layer 51 of the HD DVD 50, and the parallel light in turn impinges on the rising mirror 7.

Though the description is simplified due to no relation to the gist of the present invention, the optical pickup apparatus 1 moves e.g., from radially inside (+) to radially outside (−) in the radial direction of the HD DVD 50, CD 52, and DVD 54, by a driving force corresponding to rotations of a stepping motor (not shown) making up an optical disc apparatus (not shown) into which the optical pickup apparatus 1 is incorporated (thread control).

Details of Objective Lens Holding Device

Figure 1:
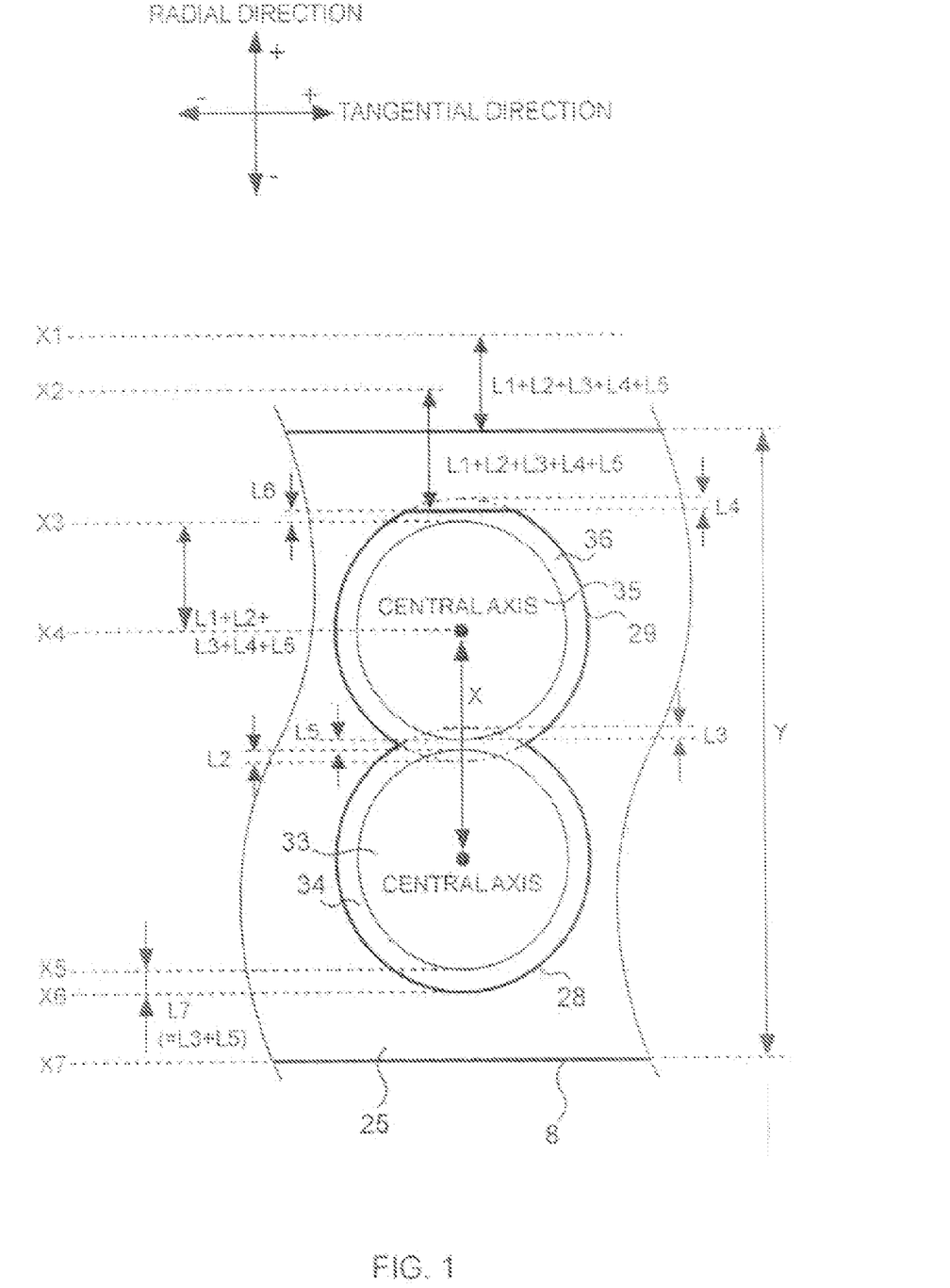
FIG. 1 depicts an objective lens holding device as well as objective lenses and a lens holder, according to the present invention.
Figure 4:
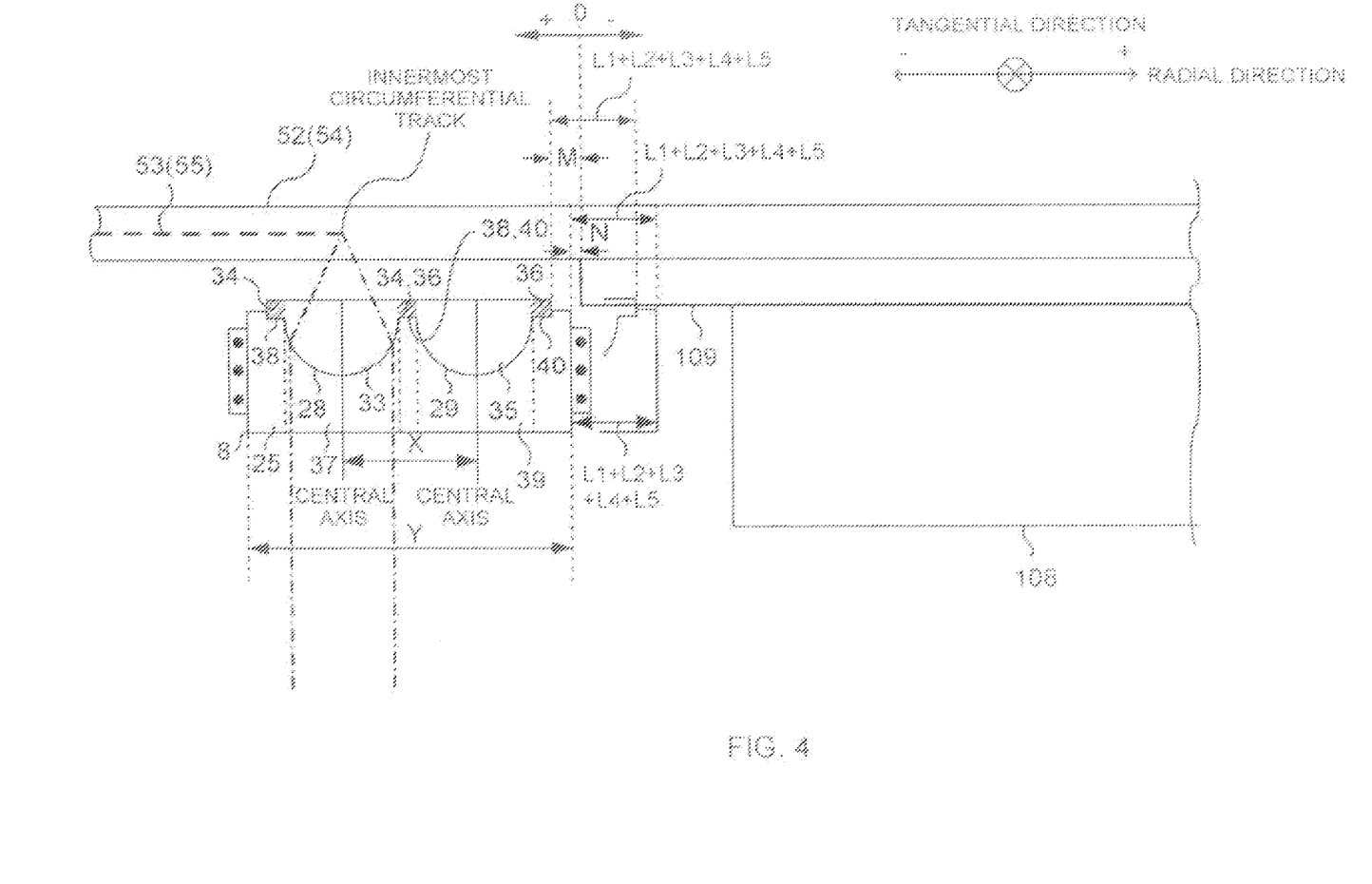
FIG. 4 is a front view of the objective lens holding device of the present invention.
Figure 12:
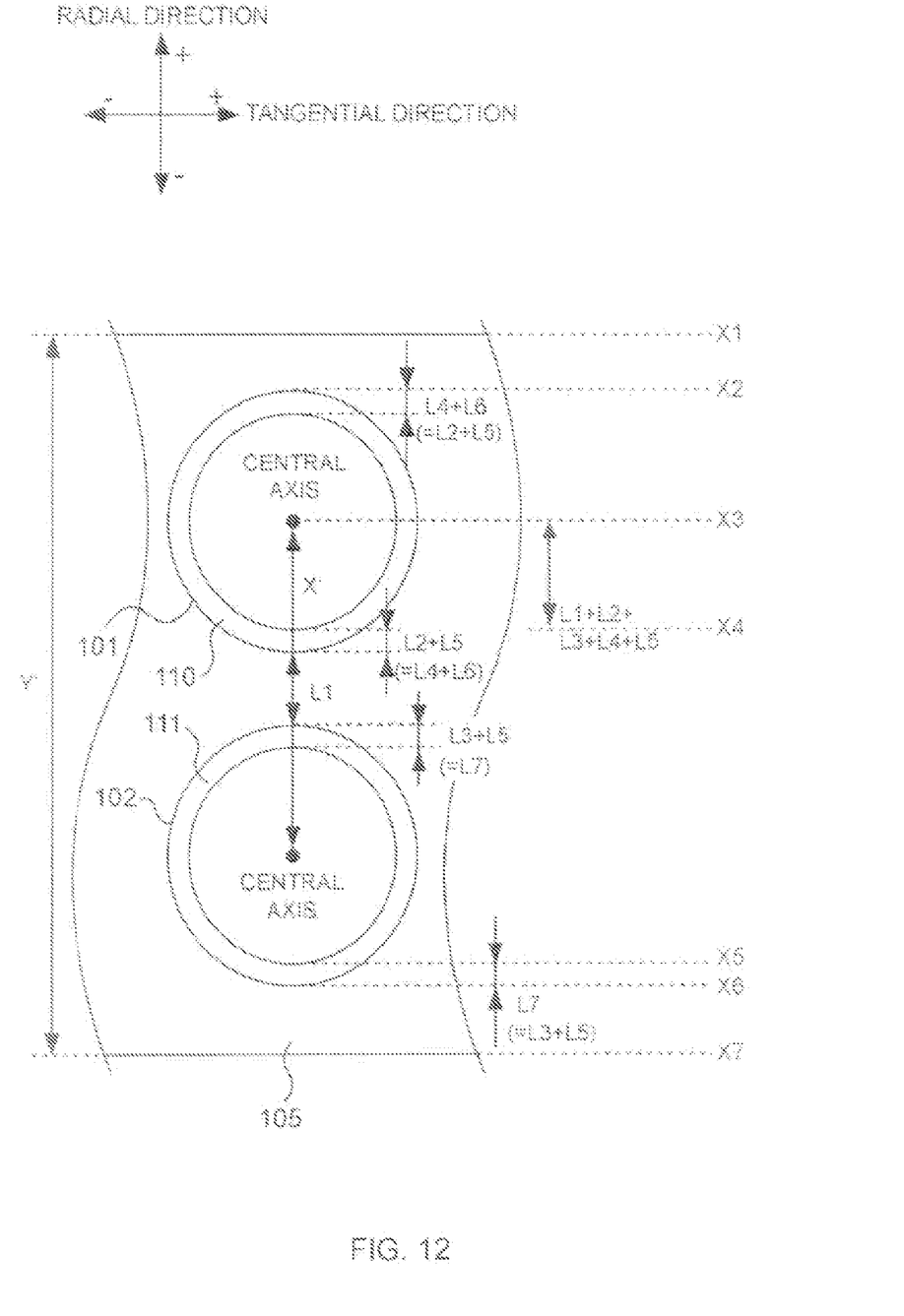
FIG. 12 depicts an objective lens holding device as well as objective lenses and a lens holder.

Referring properly to FIG. 10, the objective lens holding device 8 according to the present invention will hereinbelow be described in detail with reference to FIGS. 1, 4, and 12. FIG. 12 is a front view of the conventional objective lenses 101 and 102 and lens holder 105 of FIG. 10 viewed from the optical axis direction. FIG. 1 is a front view of the objective lens holding device 8 of the present invention viewed from the optical axis direction. FIG. 4 is a front view of the objective lens holding device 8 viewed from the plus (+) tangential direction.

The first objective lens 28 and the second objective lens 29 will first be detailed. The first objective lens 28 includes a first lens unit 33 and a first edge portion 34 (see hatched portions of FIG. 4). The first lens unit 33 focuses red laser light and infrared laser light or converts the reflected light of red laser light and the reflected light of infrared laser light into parallel lights as described hereinabove. The first edge portion 34 radially protrudes from a peripheral face surrounding a face (output face) of the first lens unit 33 from which red laser light and infrared laser light are emitted to the DVD 54 and CD 52. The second objective lens 29 includes a second lens unit 35 and a second edge portion 36. The second lens unit 35 focuses blue-violet laser light or converts the reflected light of blue-laser light into parallel light as described hereinabove. The second edge portion 36 radially protrudes from a peripheral face surrounding a face (output face) of the second lens unit 35 from which blue-violet laser light is emitted to the HD DVD 50. It should be noted that as shown in FIG. 1 and FIG. 4, the first edge portion 34 on the side which is confronting the second edge portion 36 is coupled to the second edge portion 36 on the side which is confronting the first edge portion 34. As a result, the first objective lens 28 and the second objective lens 29 are integrated.

An axis-to-axis distance X in the radial direction between a central axis of the first objective lens 28 and a central axis of the second objective lens 29 is set to a distance that will be described below when the radially outside first objective lens 28 focuses laser light on the innermost circumference of the information recording layer 53 (55) as shown in FIG. 4, in order to prevent the second edge portion 36 of the radially inside second objective lens 29 from butting against the turntable 109. It should be noted in this embodiment that the innermost circumference of the information recording layer 53 (55) refers to an innermost circumference of a read-in area where address information, etc., for information recording/reproduction is recorded or refers to an innermost circumference of the PCA further inside of the read-in area when the optical disc is an optical disc recordable or rewritable. When the optical disc is Light Scribe enabled, it refers to an innermost circumference of an area where information indicative of Light Scribe enabled is recorded, further inside of the PCA. In other words the innermost circumference of the information recording layer in this embodiment refers to radially most inside tracks on which laser light is applied for information recording/reproduction (including drawings, etc) on the optical disc.

Comparing FIGS. 1 and 12 with proper reference to FIG. 4, description will hereinbelow be made of setting of the axis-to-axis distance X between the central axis of the first objective lens 28 and the central axis of the second objective lens 29. It should be noted in the following description that lengths L1 to L7 refer to the length in the radial direction.

The length L5 (a first length) of the first edge portion 34 on the side thereof which is coupled to the second edge portion 36, is less by L3 than the length L3+L5 of the edge portion 111 of the objective lens 102 on the side thereof which is confronting the edge portion 110 of the objective lens 101. That is, the length L5 is less by L3 than the length L7 of the first edge portion 34 on the side thereof which is not coupled to the second edge portion 36.

The length L5 (a second length) of the second edge portion 36 on the side which is thereof coupled to the first edge portion 34, is less by L2 than the length L2+L5 of the edge portion 110 of the objective lens 101 on the side thereof which is confronting the edge portion 111 of the objective lens 102. That is, the length L5 is less by L2 than the length L4+L6 of the edge portion 110 of the objective lens 101 on the side thereof which is not coupled to the edge portion 111 of the objective lens 102.

The length L5 of the first edge portion 34 on the side thereof which is coupled to the second edge portion 36, and the length L5 of the second edge portion 36 on the side thereof which is coupled to the first edge portion 34, are in common.

The length L6 of the second edge portion 36 on the side thereof which is not coupled to the first edge portion 34, is shorter by L4 than the length L4+L6 of the edge portion 110 of the objective lens 101 on the side thereof which does not confront the edge portion 111 of the object lens 102.

The length L1 between the edge portion 110 of the objective lens 101 and the edge portion 111 of the objective lens 102 confronting each other becomes zero as a result of coupling of the first edge portion 34 with the second edge portion 36.

In consequence, the sum of the lengths of the first edge portion 34 and the second edge portion 36 in the radial direction is less by L2+L3+L4+L5 than the sum of the lengths of the edge portion 110 of the objective lens 101 and the edge portion 111 of the objective lens 102. The length L1 is zero. Thus, the axis-to-axis distance X between the central axis of the first objective lens 28 and the central axis of the second objective lens 29 is set to be less by L1+L2+L3+L4+L5 than an axis-to-axis distance X' between the central axis of the objective lens 101 and the central axis of the objective lens 102. That is, the axis-to-axis distance X between the central axis of the first objective lens 28 and the central axis of the second objective lens 29 is set depending on the sum of the lengths of the first edge portion 34 and the second edge portion 36 in the radial direction. For example, by setting the radial position of the first objective lens 28 when the lens is held in the lens holder 25, to be equal to the radial position of the objective lens 102, the radial position of the second edge portion 36 on the side thereof which is not coupled to the first edge portion 34 can be closer to the first objective lens 28 by L1+L2+L3+L4+L5 than the radial position of the edge portion 110 of the objective lens 101 on the side thereof which is not confronting the edge portion 111 of the objective lens 102. As a result, if L1+L2+L3+L4+L5 is greater than the distance M on the minus(−) side between the edge portion 110 of the objective lens 101 and the turntable 109 shown in FIG. 10, then the distance M (see FIG. 4) between the second edge portion 36 and the turntable 109 can be on the plus(+) side. This means that the second edge portion 36 does not butt against the turntable 109.

The lens holder 25 will then be described in detail. The lens holder 25 includes a first hole 37, a first contacting portion 38, a second hole 39, and a second contacting portion 40. The first contacting portion 38 and the second contacting portion 40 are joined together on the side where the first edge portion 34 and the second edge portion 36 confront each other. The first lens unit 33 is dropped into the first hole 37. As a result of the first contacting portion 38 coming into contact with the first edge portion 34, dropping of the first lens unit 33 into the first hole 37 is restricted to a predetermined position. The contact of the first contacting portion 38 with the first edge portion 34 may firmly be fixed by applying adhesives, etc. The second lens unit 35 is dropped into the second hole 39. As a result of the second contacting portion 40 coming into contact with the second edge portion 36, dropping of the second lens unit 35 into the second hole 39 is restricted to a predetermined position. The contact of the second contacting portion 40 with the second edge portion 36 may also firmly be fixed by applying adhesives, etc. In consequence, the lens holder 25 holds the first objective lens 28 and the second objective lens 29 in an adjacent and integral manner. The lens holder 25 is incorporated into the optical pickup apparatus 1 such that the lens holder holds the first objective lens 28 radially outside and holds the second objective lens 29 radially inside along the radial direction. As a result, red laser light and infrared laser light from the rising mirror 17 passes through the first hole 37 to enter the first objective lens 28, and the reflected lights of red laser light and infrared laser light emitted from the first objective lens 28 pass through the first hole 37 to strike on the rising mirror 17. Blue-violet laser light from the rising mirror 7 passes through the second hole 39 to enter the second objective lens 29, and the reflected light of blue-violet laser light emitted from the second objective lens 29 passes through the second hole 39 to strike on the rising mirror 7.

A length Y of the lens holder 25 in the radial direction is set to a length that will be described below when the radially outside first objective lens 28 focuses laser light on the innermost circumference of the information recording layer 53 (55), in order to prevent the lens holder 25 from butting against the turntable 109.

Comparing FIGS. 1 and 12 with proper reference to FIG. 4, description will be made hereinbelow. As described above, the sum of the lengths of the first edge portion 34 and the second edge portion 36 in the radial direction is less by L2+L3+L4+L5 than the sum of the lengths of the edge portion 110 of the objective lens 101 and the edge portion 111 of the objective lens 102. The length L1 is zero. The length Y of the lens holder 25 in the radial direction is set to be less by L1+L2+L3+L4+L5 than a length Y' of the lens holder 105 in the radial direction. That is, the length Y of the lens holder 25 in the radial direction is set depending on the sum of the lengths of the first edge portion 34 and the second edge portion 36 in the radial direction. For example, when the lens holder 25 is incorporated in the optical pickup apparatus 1, by setting the radial position of the lens holder 25 on the side thereof which is not confronting the turntable 109 to be equal to the radial position of the lens holder 105, the radial position of the lens holder 25 on the side thereof which is confronting the turntable 109 can be further from the turntable 109 by L1+L2+L3+L4+L5 than the radial position of the lens holder 105 on the side thereof which is confronting the turntable 109. As a result, if L1+L2+L3+L4+L5 is greater than a distance N on the minus(−) side between the lens holder 105 and the turntable 109 shown in FIG. 10, then the distance M (see FIG. 4) between the lens holder 25 and the turntable 109 can be on the plus (+) side. That is, even in the case that the distance between the CD 52 (DVD 54) and the lens holder 25 in the optical axis direction of laser light is set to be less than the distance between the CD 52 (DVD 54) and the face of the turntable 109 on which the CD 52 (DVD 54) is not mounted, and even in the case that the distance N between the lens holder 25 and the turntable 109 in the radial direction is on the minus (−) side, the lens holder 25 does not butts against the turntable 109. Similarly, in the case that the distance N is on the minus(−) side (FIG. 10), and in the case that the distance between the lens holder 25 and the turntable 109 in the optical axis direction of laser light is less than the distance of movement of the lens holder 25 by the focusing control, the lens holder 25 does not butt against the turntable 109.

Although, in the above embodiment the length L6 of the second edge portion 36 on the side thereof which is not coupled to the first edge portion 34 is set to be less by L4 than the length L4+L6 of the edge portion 110 of the objective lens 101 on the side thereof which is not confronting the edge portion 111 of the objective lens 102 in order to keep the distance M between the second edge portion 36 and the turntable 109 in the radial direction on the plus (+) side (and/or the distance N on the plus(+) side), this is not intended to be limitative.

Figure 5:
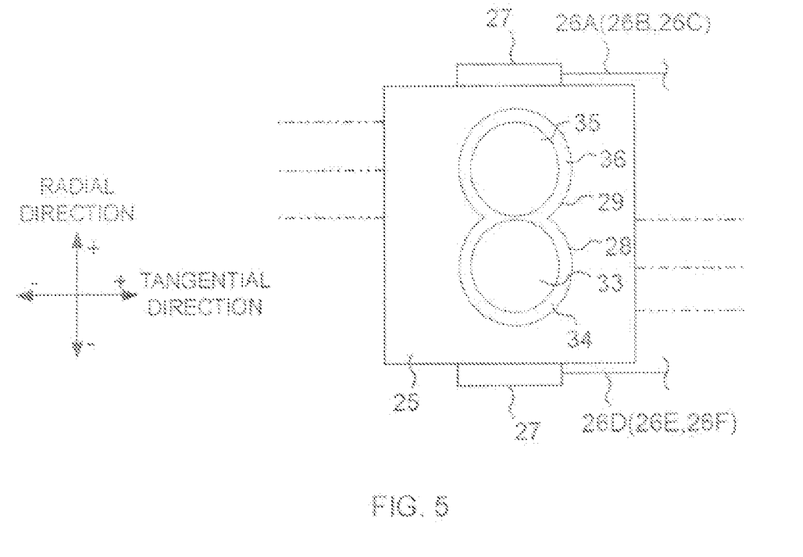
FIG. 5 depicts another form of the objective lens holding device of the present invention.

For example, when L1+L2+L3+L5 meets the condition that the distance M (and/or the distance N) is on the plus(+) side, the length of the second edge portion 36 on the side thereof which is not coupled to the first edge portion 34 may be equal to the length L4+L6 of the edge portion 110 of the objective lens 101 on the side thereof which is not confronting the edge portion 111 of the objective lens 102 as shown in FIG. 5. As a result of this, it becomes possible to ensure a securer contact of: the second edge portion 36 on the side thereof which is not coupled to the first edge portion 34; with the second contacting portion 40, thereby enabling the lens holder 25 to more stably hold the second objective lens 29.

Although the length L5 of the first edge portion 34 on the side thereof which is coupled to the second edge portion 36 (or the length L5 of the second edge portion 36 on the side thereof which is coupled to the first edge portion 34) is given to keep the distance M between the second edge portion 36 and the turntable 109 in the radial direction on the plus(+) side, this is not intended to be limitative. For example, when L1+L2+L3+L4+L5 does not meet the condition that the distance M (and/or the distance N) is on the plus(+) side, the length L5 of the first edge portion 34 on the side thereof which is coupled to the second edge portion 36 (or the length L5 of the second edge portion 36 on the side thereof which is coupled to the first edge portion 34) may be set to zero. As a result, the sum of the lengths in the radial direction of the first edge portion 34 and the second edge portion 36 can be less than the sum of the lengths in the radial direction of the edge portion 110 of the objective lens 101 and the edge portion 111 of the objective lens 102. Then, when L1+L2+L3+L4+2·L5 is greater than the distance M on the minus(−) side between the edge portion 110 of the objective lens 101 and the turntable 109 as shown in FIG. 10, the distance M can be kept on the plus(+) side.

According to the above embodiment, the first objective lens 28 and the second objective lens 29 can be integrated by coupling the first edge portion 34 on the side thereof which is confronting the second edge portion 36 to the second edge portion 36 on the side thereof which is confronting the first edge portion 34. As a result, the axis-to-axis distance X between the central axis of the first objective lens 28 and the central axis of the second objective lens 29 can be less than the axis-to-axis distance X' between the central axis of the objective lens 101 and the central axis of the objective lens 102. When the first objective lens 28 and the second objective lens 29 are not integrated, the first objective lens 28 and the second objective lens 29 may possibly tilt in their respective different directions with respect to HD DVD 50, CD 52 and DVD 54 due to e.g., deterioration over time, impacts, etc. In this case, the correction for the tilt of the first objective lens 28 and the correction for the tilt of the second objective lens 29 need to be made respectively depending on their respective tilts. However, integrating the first 28 and the second 29 objective lenses allows the first objective 28 and the second 29 objective lenses to have the same tilt. Hence, for example, the same correction can be made to the tilt at the time of start of information recording/reproduction onto/from the HD DVD 50, CD 52, and DVD 54, thereby facilitating control for the correction. Due to no need for a reduction in the diameter of the first lens unit 33 and the second lens unit 35 which may lead to a reduction in the quantity of light of red laser light (infrared laser light), satisfactory information recording/reproduction can be carried out.

When the first objective lens 28 focuses red laser light (infrared laser light) on the innermost circumference of the information recording layer 53 (55) of the CD 52 (DVD 54), the axis-to-axis distance X can be set to such a distance as to prevent the second edge portion 36 from butting against the turntable 109, depending on the length L5 in the radial direction of the first edge portion 34 on the side thereof which is confronting the second edge portion 36 and depending on the length L5 in the radial direction of the second edge portion 36 on the side thereof which is confronting the first edge portion 34. This ensures satisfactory information recording/reproduction onto/from the innermost circumference of the information recording layer 53 (55) of the CD 52 (DVD 54).

When the first objective lens 28 focuses red laser light (infrared laser light) on the innermost circumference of the information recording layer 53 (55) of the CD 52 (DVD 54), the length Y of the lens holder 25 in the radial direction can be set to such a length as to prevent the lens holder 25 from butting against the turntable 109, depending on the length L5 in the radial direction of the first edge portion 34 on the side thereof which is confronting the second edge portion 36 and depending on the length L5 in the radial direction of the second edge portion 36 on the side thereof which is confronting the first edge portion 34. This ensures satisfactory information recording/reproduction onto/from the innermost circumference of the information recording layer 53 (55) of the CD 52 (DVD 54).

The optical pickup apparatus 1 comprising the objective lens holding device 8 can also be provided. That is, the optical pickup apparatus 1 can be provided, wherein when the first objective lens 28 focuses red laser light (infrared laser light) on the innermost circumference of the information recording layer 53 (55) of the CD 52 (DVD 54), an axis-to-axis distance X in the optical pickup apparatus 1 is set to such a distance as to prevent the second edge portion 36 from butting against the turntable 109, depending on the length L5 in the radial direction of the first edge portion 34 on the side thereof which is confronting the second edge portion 36 and depending on the length L5 in the radial direction of the second edge portion 36 on the side thereof which is confronting the first edge portion 34.

Other Embodiments

Although the objective lens holding device according to the present invention has hereinabove been set forth, the above description is only for the purpose of facilitating the understanding of the present invention and is not intended to limit the scope of the present invention. The present invention may variously be changed or modified without departing from the spirit thereof.

<<Other Forms of Objective Lens Holding Device>>

Although the above embodiment integrates the first objective lens 28 and the second objective lens 29 by coupling the first edge portion 34 on the side thereof which is confronting the second edge portion 36 to the second edge portion 36 on the side thereof which is confronting the first edge portion 34 in order to keep the distance M between the second edge portion 36 and the turntable 109 in the radial direction on the plus(+) side, this is not intended to be limitative.

Figure 6:
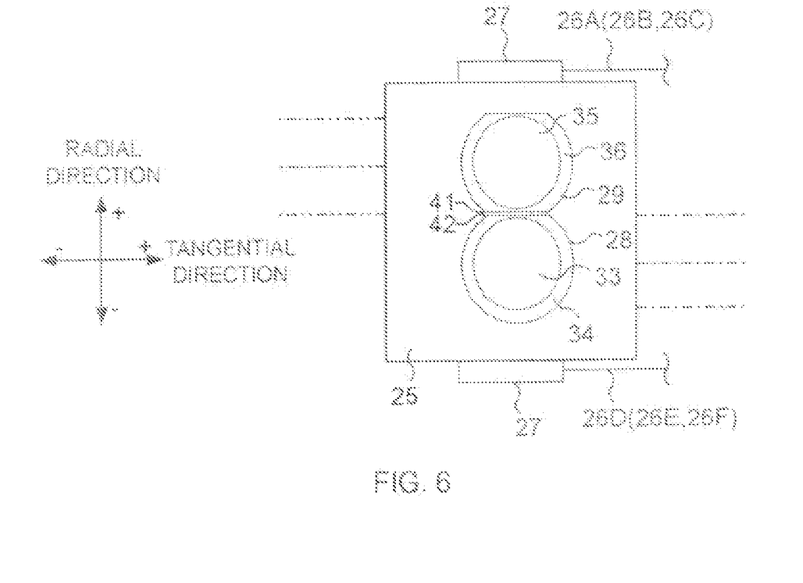
FIG. 6 depicts another form of the objective lens holding device of the present invention.
Figure 7:
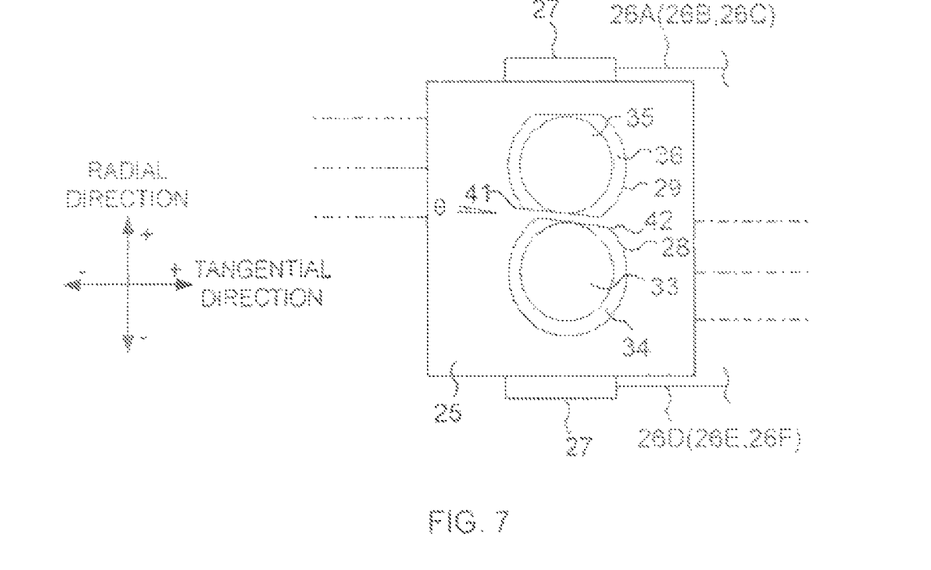
FIG. 7 depicts another form of the objective lens holding device of the present invention.

For example, as shown in FIG. 6, the first objective lens 28 and the second objective lens 29 may separately be disposed without coupling the first edge portion 34 on the side thereof which is confronting the second edge portion 36 to the second edge portion 36 on the side thereof which is confronting the first edge portion 34. The first edge portion 34 on the side thereof which is confronting the second edge portion 36 is cut away in the tangential direction (the direction orthogonal to the radial direction). The second edge portion 36 on the side thereof which is confronting the first edge portion 34 is also cut away in the tangential direction (the same direction as the direction orthogonal to the radial direction). The sum of a length (a first length) of the first edge portion 34 on the side thereof which is confronting the second edge portion 36, a length (a second length) of the second edge portion 36 on the side thereof which is confronting the first edge portion 34, and a length between the first edge portion 34 and the second edge portion 36 is equal to the length L5 shown in FIG. 1. A length of the second edge portion 36 on the side thereof which is not confronting the first edge portion 34 is equal to the length L6 shown in FIG. 1. Such a separate disposition of the first objective lens 28 and the second objective lens 29 also enables the axis-to-axis distance X between the central axis of the first objective lens 28 and the central axis of the second objective lens 29 to be less by L1+L2+L3+L4+L5. For example, in the case that only the first objective lens 28 is defective, or in the case that only the first objective lens 28 is to be replaced or improved, the treatment can be made without removing the second objective lens 29 from the lens holder 25, making it possible to achieve cost reduction or to prevent complications or troubles. Though the first edge portion 34 on the side thereof which is confronting the second edge portion 36 is cut away in the tangential direction, and the second edge portion 36 on the side thereof which is confronting the first edge portion 34 is also cut away in the tangential direction, the present invention is not limited to the above. For example, as shown in FIG. 7, the first edge portion 34 on the side thereof which is confronting the second edge portion 36 may be cut away in a direction forming a predetermined angle θ relative to the tangential direction such that a cutaway edge 41 is outside of the first lens unit 33, and the second edge portion 36 on the side thereof which is confronting the first edge portion 34 may be cut away in the same direction as the direction forming the predetermined angle θ relative to the tangential direction such that a cutaway edge 42 is outside of the second lens unit 35. That is, also by cutting away in the same direction both the first edge portion 34 on the side thereof which is confronting the second edge portion 36 and the second edge portion 36 on the side thereof which is confronting the first edge portion 34, the axis-to-axis distance X between the first objective lens 28 and the second objective lens 29 can be set to such a distance as to prevent the second edge portion 36 from butting against the turntable 109.

The cutaway edge 41 of the first edge portion 34 and the cutaway edge 42 of the second edge portion 36 are not limited to straight in shape, but instead may be triangular-waved or waved in shape, etc. as long as a certain distance can be kept between the first edge portion 34 and the second edge portion 36. It is also possible that the first objective lens 28 and the second objective lens 29 described in FIG. 5 may separately be disposed as shown in FIG. 8.

Figure 8:
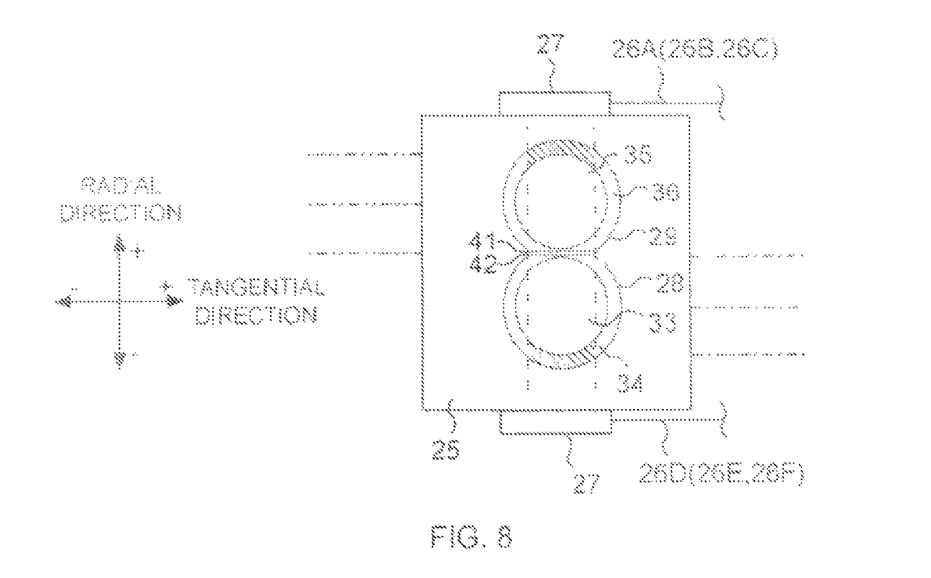
FIG. 8 depicts another form of the objective lens holding device of the present invention.

The first edge portion 34 on the side thereof which is confronting the second edge portion 36 refers to the portion with a cutaway edge (cutaway edge 42 side), while the first edge portion 34 on the side thereof which is not confronting the second edge portion 36 refers to the portion without a cutaway edge (hatched portion) and is opposed to the portion with a cutaway edge in the radial direction (between broken lines of FIG. 8). The length in the radial direction of the portion with a cutaway edge of the first edge portion 34 between the broken lines of FIG. 8 is less than the length in the radial direction of the portion without a cutaway edge of the first edge portion 34 between the broken lines. Similarly, the second edge portion 36 on the side thereof which is confronting the first edge portion 34 refers to the portion with a cutaway edge (cutaway edge 41 side), while the second edge portion 36 on the side thereof which is not confronting the first edge portion 34 refers to the portion without a cutaway edge (hatched portion) and is opposed to the portion with a cutaway edge in the radial direction (between broken lines of FIG. 8). The length in the radial direction of the portion with a cutaway edge of the second edge portion 36 between the broken lines of FIG. 8 is less than the length in the radial direction of the portion without a cutaway edge of the second edge portion 36 between the broken lines.

According to the other embodiment described above, when the first objective lens 28 focuses red laser light (infrared laser light) on the innermost circumference of the information recording layer 53 (55) of the CD 52 (DVD 54), the axis-to-axis distance X between the central axis of the first objective lens 28 and the central axis of the second objective lens 29 can be set to such a distance as to prevent the second edge portion 36 from butting against the turntable 109, depending on the length L5 in the radial direction of the first edge portion 34 on the side thereof which is confronting the second edge portion 36 and depending on the length L5 in the radial direction of the second edge portion 36 on the side thereof which is confronting the first edge portion 34. It becomes possible to ensure satisfactory information recording/reproduction onto/from the innermost circumference of the information recording layer 53 (55) of the CD 52 (DVD 54).

The first edge portion 34 on the side thereof which is confronting the second edge portion 36 may be of a shape cut away in a direction intersecting the radial direction, while the second edge portion 36 on the side thereof which is confronting the first edge portion 34 may be of a shape cut away in the same direction as the direction intersecting the radial direction. This enables the distance between the first edge portion 34 on the side thereof which is confronting the second edge portion 36 and the second edge portion 36 on the side thereof which is confronting the first edge portion 34 to effectively be reduced, making it possible to set the axis-to-axis distance X to such a distance as to prevent the second edge portion 36 from butting against the turntable 109.

The first edge portion 34 on the side thereof which is confronting the second edge portion 36 may be of a shape cut away in a direction orthogonal to the radial direction, while the second edge portion 36 on the side thereof which is confronting the first edge portion 34 may be of a shape cut away in the same direction as the direction orthogonal to the radial direction. This enables the distance between the first edge portion 34 on the side thereof which is confronting the second edge portion 36 and the second edge portion 36 on the side thereof which is confronting the first edge portion 34 to be reduced to a minimum.

Furthermore, when the first objective lens 28 focuses red laser light (infrared laser light) on the innermost circumference of the information recording layer 53 (55) of the CD 52 (DVD 54), the length Y of the lens holder 25 in the radial direction can be set to such a length as to prevent the lens holder 25 from butting against the turntable 109 depending on the length L5 in the radial direction of the first edge portion 34 on the side thereof which is confronting the second edge portion 36 and on the length L5 in the radial direction of the second edge portion 36 on the side thereof which is confronting the first edge portion 34. It makes it possible to ensure satisfactory information recording/reproduction onto/from the innermost circumference of the information recording layer 53 (55) of the CD 52 (DVD 54).

Furthermore, there can be provided the optical pickup apparatus 1 comprising the objective lens holding device 8.

What is claimed is:

1. An objective lens holding device comprising:
a first objective lens including a first lens unit that, when a first optical disc is mounted on a turntable, focuses first laser light on an information recording layer of the first optical disc, and a first edge portion protruding from a peripheral face of the first lens unit on the side thereof from which the first laser light is emitted;
a second objective lens including a second lens unit that, when a second optical disc with an information recording format different from that of the first optical disc is mounted on the turntable, focuses second laser light with a wavelength different from that of the first laser light on an information recording layer of the second optical disc, and a second edge portion protruding from a peripheral face of the second lens unit on the side thereof from which the second laser light is emitted; and
a lens holder including a first hole into which the first lens unit is dropped, a first contacting portion that contacts with the first edge portion to restrict dropping of the first lens unit into the first hole, a second hole into which the second lens unit is dropped, and a second contacting portion that contacts with the second edge portion to restrict dropping of the second lens unit into the second hole, the lens holder integrally holding the first objective lens and the second objective lens in an adjacent manner on the outside and inside, respectively, along a radial direction of the first optical disc and the second optical disc when the first optical disc and the second optical disc are mounted on the turntable, the lens holder being shiftable along the radial direction, wherein
a first length in the radial direction of the first edge portion on the side thereof which is confronting the second edge portion is less than a length in the radial direction of the first edge portion on the side thereof which is not confronting the second edge portion, and/or a second length in the radial direction of the second edge portion on the side thereof which is confronting the first edge portion is less than a length in the radial direction of the second edge portion on the side thereof which is not confronting the first edge portion, and wherein
an axis-to-axis distance between a central axis of the first objective lens and a central axis of the second objective lens is set to a distance, depending on the first length and the second length, which distance prevents the second edge portion from butting against the turntable when the first objective lens focuses the first laser light on an innermost circumference of the information recording layer of the first optical disc.

2. The objective lens holding device of claim 1, wherein
the first edge portion on the side thereof which is confronting the second edge portion is of a shape cut away in a direction intersecting the radial direction, and wherein
the second edge portion on the side thereof which is confronting the first edge portion is of a shape cut away in the same direction as the direction intersecting the radial direction.

3. The objective lens holding device of claim 2, wherein
the first edge portion on the side thereof which is confronting the second edge portion is of a shape cut away in a direction orthogonal to the radial direction, and wherein
the second edge portion on the side thereof which is confronting the first edge portion is of a shape cut away in the same direction as the direction orthogonal to the radial direction.

4. The objective lens holding device of claim 1, wherein
a length of the lens holder in the radial direction is set to a length, depending on the first length and the second length, which length prevents the lens holder from butting against the turntable when the first objective lens focuses the first laser light on the innermost circumference of the information recording layer of the first optical disc.

5. An optical pickup apparatus comprising the objective lens holding device of claim 1.

6. An objective lens holding device comprising:
a first objective lens including a first lens unit that, when a first optical disc is mounted on a turntable, focuses first laser light on an information recording layer of the first optical disc, and a first edge portion protruding from a peripheral face of the first lens unit on the side thereof from which the first laser light is emitted;
a second objective lens including a second lens unit that, when a second optical disc with an information recording format different from that of the first optical disc is mounted on the turntable, focuses second laser light with a wavelength different from that of the first laser light on an information recording layer of the second optical disc, and a second edge portion protruding from a peripheral face of the second lens unit on the side thereof from which the second laser light is emitted; and
a lens holder including a first hole into which the first lens unit is dropped, a first contacting portion that contacts with the first edge portion to restrict dropping of the first lens unit into the first hole, a second hole into which the second lens unit is dropped, and a second contacting portion that contacts with the second edge portion to restrict dropping of the second lens unit into the second hole, the lens holder integrally holding the first objective lens and the second objective lens in an adjacent manner on the outside and inside, respectively, along a radial direction of the first optical disc and the second optical disc when the first optical disc and the second optical disc are mounted on the turntable, the lens holder being shiftable along the radial direction, wherein
the first edge portion on the side thereof which is confronting the second edge portion and the second edge portion on the side thereof which is confronting the first edge portion are joined together to integrate the first objective lens and the second objective lens.

7. The objective lens holding device of claim 6, wherein
a first length in the radial direction of the first edge portion on the side thereof which is confronting the second edge portion is less than a length in the radial direction of the first edge portion on the side thereof which is not confronting the second edge portion, and/or a second length in the radial direction of the second edge portion on the side thereof which is confronting the first edge portion is less than a length in the radial direction of the second edge portion on the side thereof which is not confronting the first edge portion, and wherein
an axis-to-axis distance between a central axis of the first objective lens and a central axis of the second objective lens is set to a distance, depending on the first length and the second length, which distance prevents the second edge portion from butting against the turntable when the first objective lens focuses the first laser light on an innermost circumference of the information recording layer of the first optical disc.

8. The objective lens holding device of claim 7, wherein
a length of the lens holder in the radial direction is set to a length, depending on the first length and the second length, which length prevents the lens holder from butting against the turntable when the first objective lens focuses the first laser light on the innermost circumference of the information recording layer of the first optical disc.

* * * * *